US012780608B2

(12) United States Patent
Immonen et al.

(10) Patent No.: US 12,780,608 B2
(45) Date of Patent: Nov. 3, 2026

(54) ELEVATOR CAR AND ELEVATOR

(71) Applicant: Kone Corporation, Helsinki (FI)

(72) Inventors: Aleksi Immonen, Helsinki (FI); Tommi Rautio, Helsinki (FI); Ari Pitkänen, Helsinki (FI); Ville Myyryläinen, Helsinki (FI); Tapani Talonen, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 19/172,930

(22) Filed: Apr. 8, 2025

(65) Prior Publication Data

US 2025/0236489 A1 Jul. 24, 2025

Related U.S. Application Data

(63) Continuation of application No. PCT/FI2022/050720, filed on Nov. 3, 2022.

(51) Int. Cl.
*B66B 11/02* (2006.01)
*B66B 1/46* (2006.01)
(Continued)

(52) U.S. Cl.
CPC .......... *B66B 11/0273* (2013.01); *B66B 1/468* (2013.01); *B66B 7/046* (2013.01);
(Continued)

(58) Field of Classification Search
CPC . B66B 11/0273; B66B 11/0206; B66B 7/046; B66B 11/0226; B66B 11/043; B66B 1/3476; B66B 1/3484; B66B 7/06
See application file for complete search history.

(56) References Cited

U.S. PATENT DOCUMENTS 6,443,266 B2 * 9/2002 Murakami .............. B66B 7/048 187/401
6,715,587 B2 * 4/2004 Sittler .................. B66B 1/3484 187/277
(Continued)

FOREIGN PATENT DOCUMENTS

CN 103086237 A * 5/2013
CN 112093626 A * 12/2020 ......... B66B 11/0226
(Continued)

OTHER PUBLICATIONS

Machine translation of CN 112093626 A (Liu et al.) (Year: 2020).*
(Continued)

*Primary Examiner* — Minh Truong
*Assistant Examiner* — Michelle M Mudwilder
(74) *Attorney, Agent, or Firm* — Harness, Dickey & Pierce, P.L.C.

(57) ABSTRACT

An elevator car and elevator that includes a pulley frame; a cabin frame mounted on the pulley frame; one or more pulleys mounted on the pulley frame; and at least one elastically deformable support member between the cabin frame and the pulley frame, the cabin frame resting on the at least one elastically deformable support member on the pulley frame. The elevator car includes at least one parallel motion linkage mechanism connecting the cabin frame pivotally to the pulley frame, and arranged to allow the cabin frame to move up and down relative to the pulley frame, and to keep a relative angle between the cabin frame and the pulley frame unchanged.

21 Claims, 4 Drawing Sheets

(51) Int. Cl.
*B66B 7/04* (2006.01)
*B66B 11/04* (2006.01)

(52) U.S. Cl.
CPC ...... *B66B 11/0206* (2013.01); *B66B 11/0226* (2013.01); *B66B 11/043* (2013.01)

(56) References Cited

U.S. PATENT DOCUMENTS

| | | | | |
|---|---|---|---|---|
| 7,410,032 | B2 * | 8/2008 | Kolb | B66B 11/02 187/401 |
| 8,857,571 | B2 * | 10/2014 | Henneau | B66B 5/12 187/411 |
| 9,511,979 | B2 | 12/2016 | Maruyama | |
| 12,344,506 | B2 * | 7/2025 | Kariya | B66B 11/0273 |
| 12,509,330 | B2 * | 12/2025 | Tomura | B66B 11/0206 |

FOREIGN PATENT DOCUMENTS

| | | | | |
|---|---|---|---|---|
| EP | 0983957 | A2 | 3/2000 | |
| EP | 0983957 | A3 | 1/2002 | |
| WO | WO-9933743 | A1 * | 7/1999 | B66B 11/0206 |
| WO | WO-2011155109 | A1 * | 12/2011 | B66B 11/0273 |
| WO | 2012072858 | A1 | 6/2012 | |
| WO | 2012072858 | A8 | 7/2012 | |
| WO | WO-2019121219 | A1 * | 6/2019 | B66B 15/04 |
| WO | WO-2021165329 | A1 * | 8/2021 | B66B 17/34 |

OTHER PUBLICATIONS

International Search Report for International Application No. PCT/FI2022/050720 dated May 25, 2023.
Written Opinion for International Application No. PCT/FI2022/050720 dated May 25, 2023.

* cited by examiner

ELEVATOR CAR AND ELEVATOR

CROSS-REFERENCE TO RELATED APPLICATION

This application is a continuation of PCT International Application No. PCT/FI2022/050720 which has an International filing date of Nov. 3, 2022, the entire contents of which are incorporated herein by reference.

FIELD OF THE INVENTION

The invention relates to an elevator car and an elevator, where the elevator is an elevator for transporting passengers and/or goods.

BACKGROUND OF THE INVENTION

Such elevators are known where the elevator car is suspended by a hoisting roping via one or more rope pulleys mounted on the car. In these elevators, the roping passes typically from a fixing point, which is in proximity of the upper end of the hoistway, down to the rope pulleys of the car, around them and back to the upper end of the hoistway, and to a drive wheel of a hoisting machine. The hoisting roping can thus pass back and forth one or more times, depending on the desired hoisting ratio. The hoisting roping can transmit forces in its longitudinal direction from the hoisting machine to the car. In this kind of elevators, in addition to the desired suspension forces, also some vibration is prone to be transmitted from the hoisting machine via the hoisting roping to the car. This vibration reduces ride comfort inside the cabin of the car.

Such cars are known where the vibration transmitted from the hoisting machine has been attenuated by providing an elastically deformable support member, such as a pad of elastic material, somewhere between the pulleys and the cabin frame, such as between a pulley frame and a cabin frame. A drawback of known solutions has been that it has been difficult to avoid transmission of vibration while at the same time connecting the pulley frame and the cabin frame to each other relatively rigidly yet allowing relative motion such that the elastically deformable support member has room to function as needed.

BRIEF DESCRIPTION OF THE INVENTION

The object of the invention is to achieve a new elevator car and elevator, which are improved in terms of attenuation of hoisting machine originated vibration. An object is particularly to introduce a new elevator car and elevator by which one or more of the above-mentioned problems of prior art and/or drawbacks discussed or implied elsewhere in the description can be alleviated. An object is particularly to achieve a simple solution, which facilitates good attenuation of vibration transmitted from a hoisting machine to cabin structures while providing sufficient rigidity between components without deteriorating the efficiency of the vibration attenuation.

It is brought forward a new elevator car comprising a pulley frame; and a cabin frame mounted on the pulley frame; and one or more pulleys mounted on the pulley frame; and cabin structures delimiting a cabin interior of the car, which cabin structures are mounted on the cabin frame; and at least one elastically deformable support member between the cabin frame and the pulley frame via which at least one elastically deformable support member the cabin frame rests, or at least can rest, on the pulley frame.

The elevator car comprises at least one parallel motion linkage mechanism connecting the cabin frame pivotally to the pulley frame, and arranged to allow the cabin frame to pivot up and down relative to the pulley frame, and to keep their relative angle unchanged.

With this kind of solution one or more of the above-mentioned objects can be facilitated.

Preferable further details of the elevator car are introduced in the following, which further details can be combined with the elevator car individually or in any combination.

In a preferred embodiment, each said elastically deformable support member is placed in a gap, which is in vertical direction between the pulley frame and the cabin frame.

In a preferred embodiment, the gap is arranged to be enlarged when the cabin frame pivots up relative to the pulley frame and narrowed when the cabin frame pivots down relative to the pulley frame.

In a preferred embodiment, the elastically deformable member is arranged to elastically resist narrowing of the gap.

In a preferred embodiment, the elastically deformable member is arranged to serve as a compression spring.

In a preferred embodiment, the at least one elastically deformable support member is/are arranged to carry completely or at least majority (i.e. more than 50%) of the total weight of the cabin frame and components mounted thereon.

In a preferred embodiment, the elevator car comprises one or more guide members for guiding movement of the car along one or more guide rails, which one or more guide members are mounted on the cabin frame.

In a preferred embodiment, the cabin structures delimiting a cabin interior of the car comprise one or more of: a floor panel, wall panels, a ceiling panel, a door.

In a preferred embodiment, said one or more pulleys comprises a first and second pulley, which are arranged to rotate on the same rotation plane around parallel horizontal axes.

In a preferred embodiment, each said parallel motion linkage mechanism comprises

- a first lever connected to the pulley frame via a first pivot and to the cabin frame via a second pivot; and
- a second lever connected to the pulley frame via a third pivot and to the cabin frame via a fourth pivot.

In a preferred embodiment, the first, second, third and fourth pivot are positioned such that

- the pivot axis of the first pivot and the pivot axis of the third pivot are on a first plane and the pivot axis of the second pivot and the pivot axis of the fourth pivot are on a second plane, wherein the first and second planes are parallel with each other; and
- the pivot axis of the first pivot and the pivot axis of the second pivot are on a third plane and the pivot axis of the third pivot and the pivot axis of the fourth pivot are on a fourth plane, wherein the third and fourth planes are parallel with each other.

In a preferred embodiment, the pivot axes of the first, second, third and fourth pivot are horizontal.

In a preferred embodiment, the first and second planes are vertical.

In a preferred embodiment, the third and fourth planes are less than 30 degrees from horizontal, more preferably less than 15 degrees from horizontal.

In a preferred embodiment, the first and second planes are beside each other and the third and fourth planes are on top of each other.

In a preferred embodiment, the pulley frame is mounted on the cabin frame by two parallel motion linkage mechanisms, in particular a first parallel motion linkage mechanism and a second parallel motion linkage mechanism, which two parallel motion linkage mechanisms are horizontally displaced from each other, the pivot axes of the first motion linkage mechanisms being arranged to coincide with the pivot axes of the second motion linkage mechanisms.

In a preferred embodiment, each said pivot comprises a shaft pin, such as a bolt member, arranged to pass through an opening, such as a hole, of a lever.

In a preferred embodiment, one or more of said pivots comprises a bushing made of plastic or elastomer or rubber around the shaft pin in the opening.

In a preferred embodiment, one or more of said pivots comprises a bushing made of plastic or elastomer or rubber via which the lever is supported axially in place.

In a preferred embodiment, the elastically deformable support member is an elastically deformable pad, such as a block made of elastic material, such as elastomer or rubber, for instance.

In a preferred embodiment, said at least one elastically deformable support member comprises plurality of said elastically deformable support members.

It is also brought forward a new elevator. The elevator comprises an elevator car as defined anywhere above.

With this kind of solution one or more of the above-mentioned objects can be facilitated.

Preferable further details of the elevator are introduced in the following, which further details can be combined with the elevator individually or in any combination.

In a preferred embodiment, the elevator comprises a hoisting roping arranged suspend the elevator car via the one or more pulleys of the car.

In a preferred embodiment, wherein the elevator comprises a hoisting roping arranged to pass around the one or more pulleys of the car.

In a preferred embodiment, the elevator comprises one or more guide rails for guiding movement of the car, the guide members mounted on the cabin frame being arranged to move by sliding or rolling along the one or more guide rails.

In a preferred embodiment, the elevator comprises a motor and a drive wheel rotatable by the motor, and an elevator control system configured to control movement of the car in response to signals received from one or more user interfaces, such as a user interface located at one or more landings and/or a user interface located inside the car, in particular by controlling rotation of the motor.

Generally, the car preferably comprises an interior wherein passenger and/or goods can be transported. The car preferably also comprises one or more doors by which the interior can be opened and closed. The door is preferably an automatic door, whereby comfortable and safe elevator use can be provided by the elevator solution.

BRIEF DESCRIPTION OF THE DRAWINGS

In the following, the present invention will be described in more detail by way of example and with reference to the attached drawings, in which.

DETAILED DESCRIPTION

Figure 1:
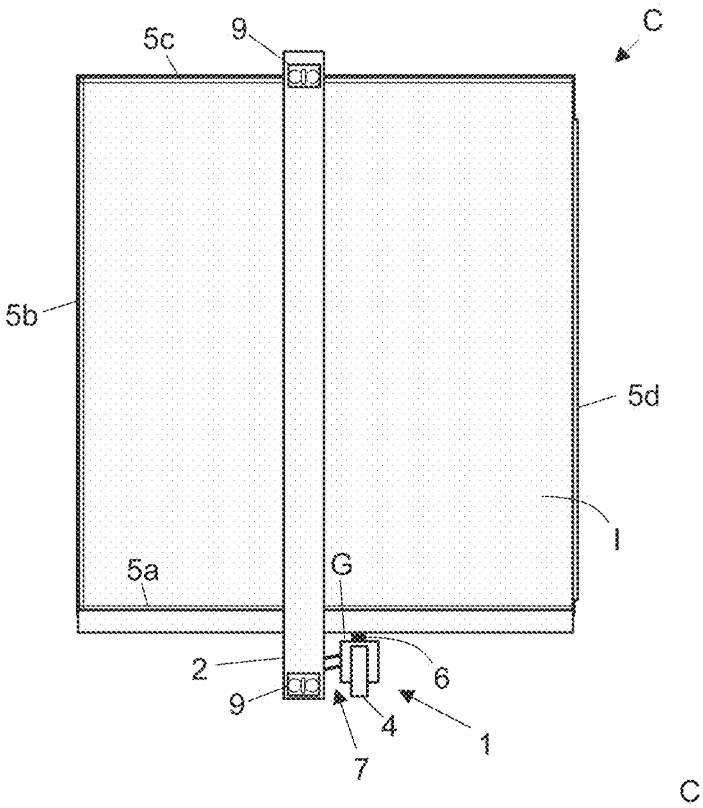
FIG. 1 illustrates schematically an embodiment of a car from a side.
Figure 2:
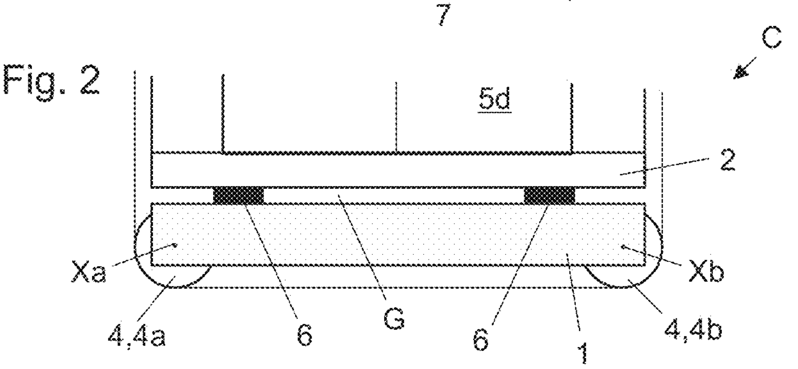
FIG. 2 illustrates the lower parts of the car of FIG. 1 from its right side.

FIG. 1 illustrates an elevator car C according to an embodiment. The elevator car C comprises a pulley frame 1; and a cabin frame 2 mounted on the pulley frame 1; and one or more pulleys 4 mounted on the pulley frame 1. The elevator car C comprises cabin structures **5*a*,5*b*,5*c*,5*d* delimiting a cabin interior I of the car 1 mounted on the cabin frame 2. Said cabin structures 5*a*,5*b*,5*c*,5*d* delimiting a cabin interior include here in particular a floor panel 5*a*, wall panels 5*b*, a ceiling panel 5*c* and a door 5*d***.

The elevator car C moreover comprises one or more elastically deformable support members 6 between the cabin frame 2 and the pulley frame 1 via which one or more elastically deformable support members 6 the cabin frame 2 rests, or at least can rest, on the pulley frame 1. Owing to the elastically deformable support member(s) 6 the cabin frame 2 can be vertically supported such that a large portion of the vibration transmitted from the hoisting machine becomes attenuated and does not reach the cabin structure. Elastically deformable support member(s) 6 can also respond well to different load situation of the car 1.

The elevator car C moreover comprises at least one parallel motion linkage mechanism 7;7A,7B connecting the cabin frame 2 pivotally to the pulley frame 1 and arranged to allow the cabin frame 2 to pivot up and down relative to the pulley frame 1, and to keep their relative angle unchanged. Hereby, lateral support and control of orientation can be simply provided between the cabin frame 2 and the pulley frame 1 while allowing them freedom to move vertically relative to each other. Freedom of the cabin frame 2 and the pulley frame 1 to move vertically relative to each other is needed for well-functioning vibration attenuation of the at least one elastically deformable support member 6. Hereby, the deformable support member(s) 6 also stay as the primary vertical load carrying members between the cabin frame 2 and the pulley frame 1 in all vibration situations and in all kinds of load situations of the car 1. Ability of the parallel motion linkage mechanism 7;7A,7B to keep the relative angle between the cabin frame 2 and the pulley frame 1 unchanged is advantageous since hereby the car 1 can hold the pulley frame 1 in upright position without risks of it twisting into incorrect position. The rest of the car 1, such as the cabin frame 2, on the other hand is simple to maintain in upright position by guide members 9 arranged to engage guide rails 11. Thus, the cabin frame 2 gives the pulley frame 1 with the parallel motion linkage mechanism 7;7A,7B horizontal support to keep it in upright position and correctly positioned in horizontal direction. The pulley frame 1 on the other hand provides vertical support for the cabin frame 2 via the elastically deformable member(s) 6.

In the preferred embodiment, each said elastically deformable member 6 is placed in a gap G, which is in vertical direction between the pulley frame 1 and the cabin frame 2. Thus, vertical support is simply transmit between the cabin frame 2 and the pulley frame 1. The gap G is arranged to be enlarged when the cabin frame 2 pivots up relative to the pulley frame 1 and narrowed when the cabin frame 2 pivots down relative to the pulley frame 1. Said elastically deformable member 6 is arranged to elastically resist narrowing of the gap G. The elastically deformable member 6 is arranged to serve as a compression spring.

In the preferred embodiment, the elevator car 1 comprises one or more guide members 9 for guiding movement of the car 1 along one or more guide rails 11, which one or more guide members 9 are mounted on the cabin frame 2. The one or more guide members 9 can give lateral support for the car 1. The one or more guide members 9 are preferably either rolling guide members, as illustrated, or sliding guide members. There are preferably plurality of said guide members 9 including guide members 9 on different vertical levels, which facilitates guidance of the car 1 in upright attitude.

In the preferred embodiment, the pulley frame 1 is in the bottom area of the car 1. Said one or more pulleys 4 comprises a first and second pulley 4*a*,4*b*, which are arranged to rotate on the same rotation plane around parallel horizontal axes Xa,Xb. The first and second pulley 4*a*,4*b* are arranged/or at least suitable for being arranged to guide a hoisting roping 10 to pass below the car 1 from one side of the car 1 to the other side, opposite side, of the car 1.

Figure 3:
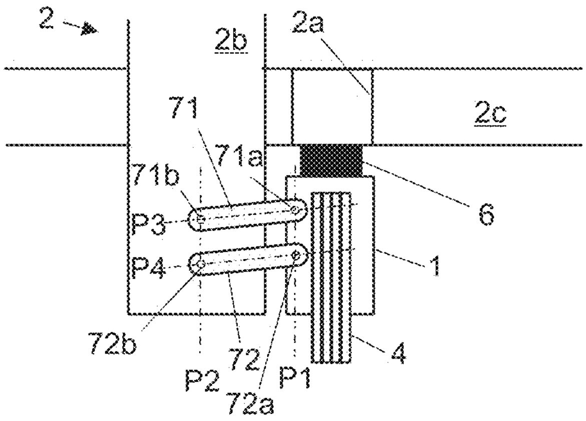
FIG. 3 illustrates schematically a parallel motion linkage mechanism connecting a cabin frame and a pulley frame of FIG. 1.
Figure 4:
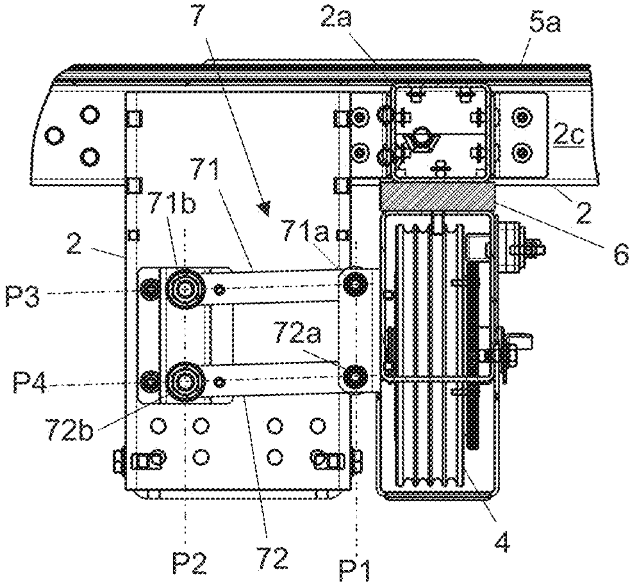
FIGS. 4-6 illustrate further preferred details of the car and parallel motion linkage mechanism of FIG. 3.
Figure 5:
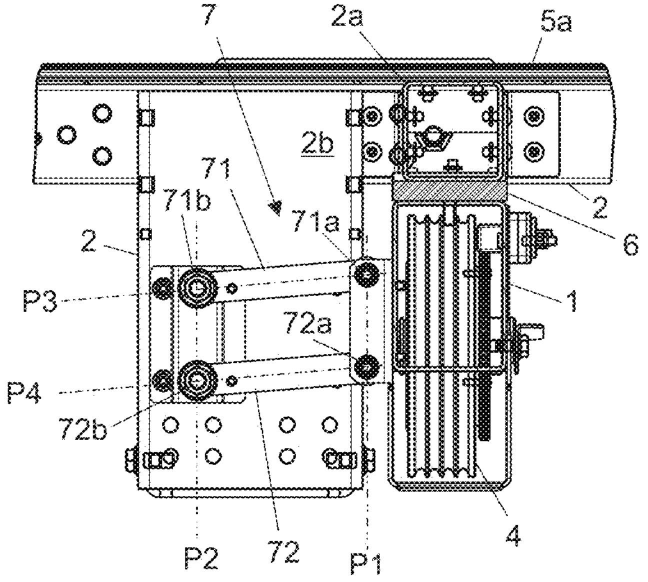
Figure 6:
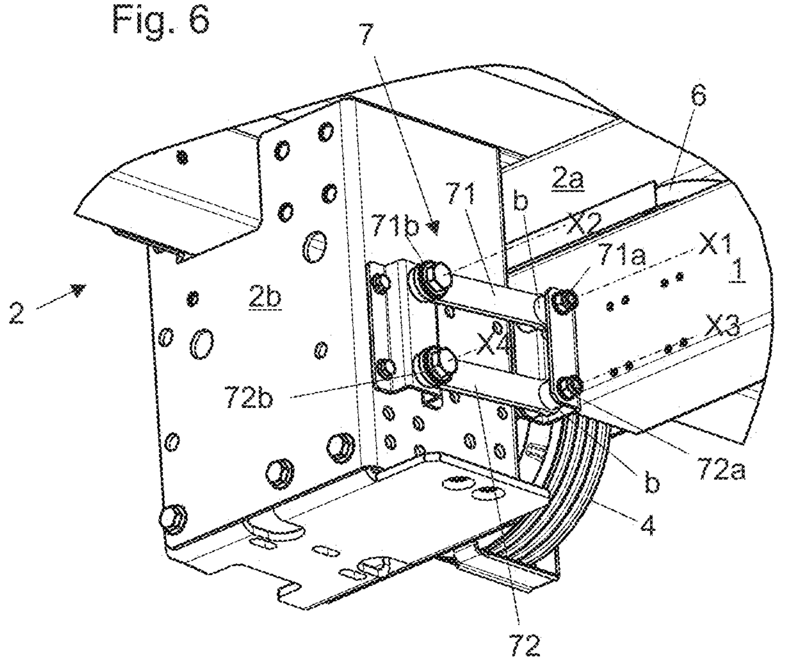

FIG. 3 illustrates schematically the structure of the parallel motion linkage mechanism 7;7A;7B. FIGS. 4-6 illustrate further preferred details thereof.

In the preferred embodiment, the parallel motion linkage mechanism 7;7A;7B comprises a first lever 71 connected to the pulley frame 1 via a first pivot 71*a* and to the cabin frame 2 via a second pivot 71*b*; and a second lever 72 connected to the pulley frame via a third pivot 72*a* and to the cabin frame via a fourth pivot 72*b*.

The first, second, third and fourth pivot 71*a*,71*b*,72*a*,72*b* are positioned such that the pivot axis X1 of the first pivot 71*a* and the pivot axis X3 of the third pivot 72*a* are on a first plane P1 and the pivot axis X2 of the second pivot 71*b* and the pivot axis X4 of the fourth pivot 72*b* are on a second plane P2, wherein the first and second planes P1,P2 are parallel with each other; and the pivot axis X1 of the first pivot 71*a* and the pivot axis X2 of the second pivot 71*b* are on a third plane P3 and the pivot axis X3 of the third pivot 72*a* and the pivot axis X4 of the fourth pivot 72*b* are on a fourth plane P4, wherein the third and fourth planes P3,P4 are parallel with each other. Hereby, the levers 71,72 control movement of the pulley frame 1 the cabin frame 2 such that their relative angle remains unchanged.

The pivot axes X1,X2,X3,X4 of the first, second, third and fourth pivot 71*a*,72*a*,71*b*,72*b* are horizontal. The first and second planes P1,P2 are preferably vertical. The first and second planes P1,P2 are beside each other and the third and fourth planes P3,P4 are on top of each other. The third and fourth planes P3,P4 are preferably less than 30 degrees from horizontal, more preferably less than 15 degrees from horizontal. Thus, no substantial lateral movement occurs when there is vertical movement between the cabin frame 2 and pulley frame 1. The angle of the third and fourth planes P3,P4 from horizontal changes when the parallel motion linkage mechanisms 7;7A,7B pivots.

In the preferred embodiment, the pulley frame 3 is mounted on the cabin frame 2 by two parallel motion linkage mechanisms 7;7A,7B, in particular a first motion linkage mechanism 7A and a second motion linkage mechanism 7B, which two parallel motion linkage mechanisms 7A,7B are horizontally displaced from each other, the pivot axes X1,X2,X3,X4 of the first motion linkage mechanisms 7A being arranged to coincide with the pivot axes X1,X2,X3,X4 of the second motion linkage mechanisms 7B.

The cabin frame 2 can be made of multiple parts 2*a*-2*c* fixed to each other e.g. by bolt connection and/or weldings. These parts 2*a*-2*c* can comprise beams 2*b*,2*c*, as for example in the illustrated embodiments. However, the specific structure of the cabin frame 2 could also be different.

In the preferred embodiment, the part 2*b* of the cabin frame 2 on which the levers 71,72 are connected via pivots 71*b*,72*b* is a bottom corner part 2*b* of the cabin frame 2. The part 2*a* of the cabin frame 2 via which the cabin frame 2 rests, or at least can rest, on the pulley frame 1 is a horizontal beam. In the preferred embodiment, the beam 2*a* rests against the elastically deformable support member 6.

Figure 8:
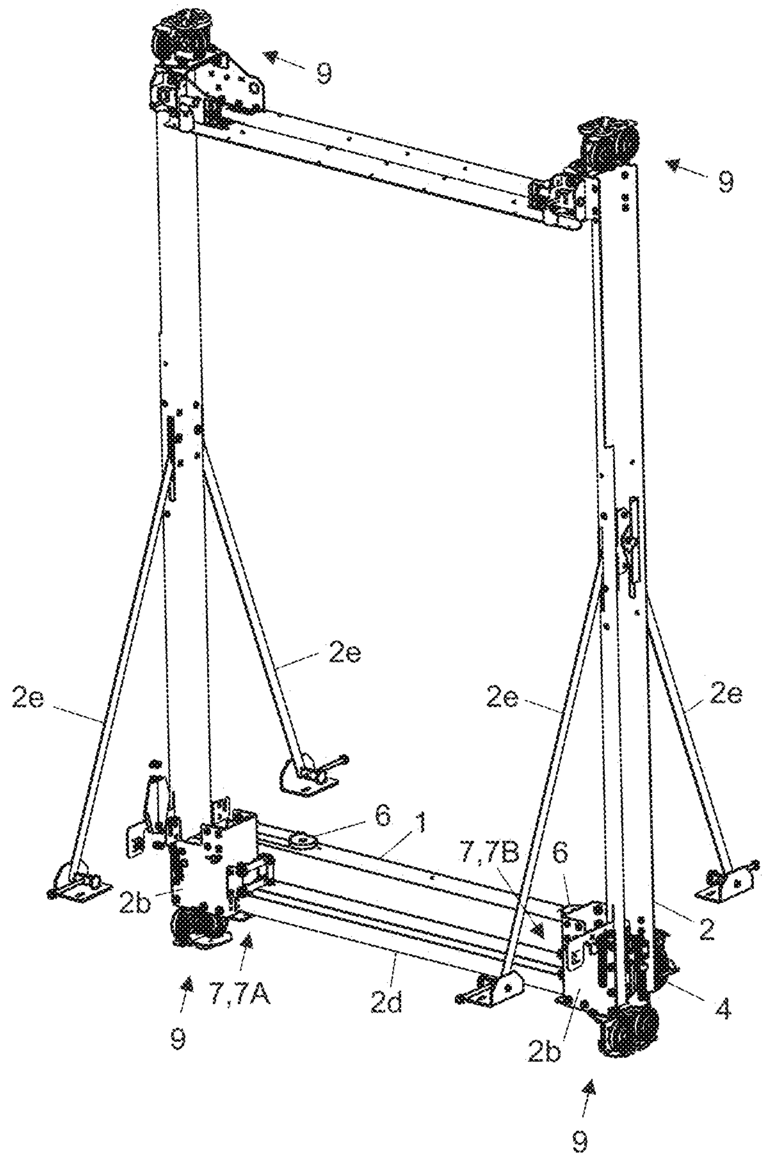
FIG. 8 illustrates preferred further details of the car.

In the preferred embodiment, the elevator car C comprises are two of said parallel motion linkage mechanisms 7;7A,7B. This facilitates more even force distribution as well as firmness and control of relative movement between the frames 1 and 2. More specifically, there are two of said bottom corner parts 2*b* and two of said parallel motion linkage mechanisms 7;7A,7B. The levers 71,72 of the two parallel motion linkage mechanisms 7A,7B are connected to opposing faces of the cabin frame 2, in particular to opposing faces of two corner parts 2*b* of the cabin frame 2. The faces being opposing, facilitates that the two parallel motion linkage mechanisms 7A,7B do not take space from the sides of the car 1. However, this kind of space efficient positioning is not necessary and connection particularly to corner parts 2*b* as described is not necessary since the levers 71,72 of each parallel motion linkage mechanism 7,7A,7B could be connected via pivots 71*b*,72*b* to any suitable face of the cabin frame 2, such as alternatively to any exterior face of the frame 2 for example if added space consumption in this area would be acceptable, for instance. FIG. 8 illustrates how the two parallel motion linkage mechanisms 7,7A,7B are preferably arranged. In the Figure, many features of the car 1 are omitted for making visible the inner structure thereof. FIG. 8 illustrates a beam 2*d* of the cabin frame 2 and diagonal struts 2*e* of the cabin frame 2, which are not visible in other Figures.

The structure of said pivots is preferably such that each said pivot 71*a*,72*a*, 71*b*,72*b* comprises a shaft pin, such as a bolt member, arranged to pass through an opening, such as a hole, of a lever 71,72. Preferably, one or more of said pivots 71*a*,72*a*, 71*b*,72*b* comprises a bushing made of plastic or elastomer or rubber around the shaft pin in the opening. Preferably, one or more of said pivots 71*a*,72*a*, 71*b*,72*b* comprises a bushing b made of plastic or elastomer or rubber via which the lever 71,72 is in axial direction supported in place. A bushing made of plastic or elastomer or rubber can attenuate vibration from transmitting to and from the levers 71,72 of a parallel motion linkage mechanism 7;7A,7B.

The elastically deformable support member 6 is preferably fixed at least to one of the cabin frame 2 and the pulley frame 1.

The elastically deformable support member 6 is preferably an elastically deformable pad, such as a block made of elastic material such as elastomer or rubber.

Figure 7:
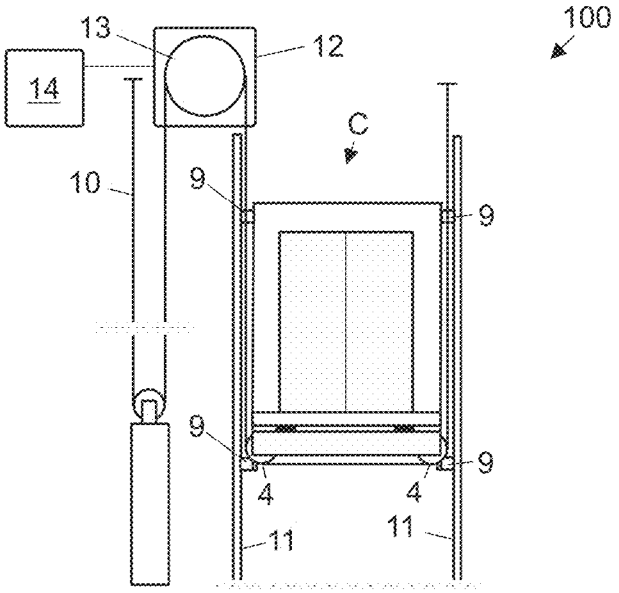
FIG. 7 illustrates an elevator according to an embodiment.

FIG. 7, illustrates an elevator 100 according to an embodiment. The elevator 100 comprises an elevator car 1 as described referring to FIGS. 1-6 and 8.

The elevator 100 comprises a hoisting roping 10 arranged suspend the elevator car 1 via the one or more pulleys 4 of the car 1. The hoisting roping 10 is arranged to pass around the one or more pulleys 4 of the car 1.

The elevator 100 comprises guide rails 11 for guiding movement of the car 1, and the car 1 comprises guide members 9 mounted on the cabin frame 2, which are arranged to move by sliding or rolling along the one or more guide rails 11.

The elevator 100 comprises a motor 12 and a drive wheel 13 rotatable by the motor 12, and an elevator control system 14 configured to control movement of the car 1 in response to signals received from one or more user interfaces, such as a user interface located at one or more landings and/or a user interface located inside the car 1, in particular by controlling rotation of the motor 12.

Generally preferably, the suspension ratio of the car is 2:1 as illustrated in Figures. However, alternatively some other suspension ratio could be used such as 4:1, for example, or any other known suspension ratio.

Generally, the features of the car 1 are described in this application in a state where the car 1 is in an upright position.

Generally preferably, the at least one elastically deformable support member is/are arranged to carry completely or at least majority (i.e. more than 50%) of the total weight of the cabin frame 2 and components mounted thereon. Thus, the at least one elastically deformable support member 6 serve(s) as the main means for supporting the cabin frame 2 and components carried by it.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. An elevator car comprising:

a pulley frame;

a cabin frame mounted on the pulley frame;

one or more pulleys mounted on the pulley frame;

cabin structures defining a cabin interior of the elevator car, the cabin structures being mounted on the cabin frame;

at least one elastically deformable support member between the cabin frame and the pulley frame, the cabin frame resting on the pulley frame via the at least one elastically deformable support member; and at least one parallel motion linkage mechanism connecting the cabin frame pivotally to the pulley frame by pivots, the at least one parallel motion linkage mechanism configured to allow the cabin frame to move up and down relative to the pulley frame while keeping a relative angle between the cabin frame and the pulley frame unchanged, wherein the at least one parallel motion linkage mechanism is pivotably connected to the pulley frame.

2. The elevator car according to claim 1, wherein each of the at least one elastically deformable support member is in a gap that extends in a vertical direction between the pulley frame and the cabin frame.

3. The elevator car according to claim 2, wherein the gap is enlarged when the cabin frame moves up relative to the pulley frame and is narrowed when the cabin frame moves down relative to the pulley frame.

4. The elevator car according to claim 1, further comprising one or more guide members configured to guide movement of the elevator car along one or more guide rails, the which one or more guide members being mounted on the cabin frame.

5. The elevator car according to claim 1, wherein the cabin structures comprise one or more of a floor panel, wall panels, a ceiling panel, and a door.

6. The elevator car according to claim 1, wherein the one or more pulleys comprise a first pulley and a second pulley configured to rotate on a same rotation plane around parallel horizontal axes.

7. The elevator car according to claim 1, wherein the at least one parallel motion linkage mechanism comprises two parallel motion linkage mechanisms, the pulley frame is mounted on the cabin frame by the two parallel motion linkage mechanisms including a first parallel motion linkage mechanism and a second parallel motion linkage mechanism horizontally displaced from each other, and first pivot axes of the first parallel motion linkage mechanism coincide with second pivot axes of the second parallel motion linkage mechanism.

8. The elevator car according to claim 1, wherein the at least one elastically deformable support member comprises an elastically deformable pad or a block made of elastic material including such as elastomer or rubber.

9. The elevator car according to claim 1, wherein the pivots comprise a bushing configured to axially support the pivots in place, and the bushing comprises plastic elastomer or rubber.

10. An elevator comprising the elevator car according to claim 1.

11. The elevator according to claim 10, further comprising a hoisting roping configured to suspend the elevator car via the one or more pulleys of the elevator car.

12. The elevator according to claim 10, further comprising a hoisting roping configured to pass around the one or more pulleys of the elevator car.

13. The elevator according to claim 10, further comprising one or more guide rails configured to guide movement of the elevator car, the elevator car comprising guide members mounted on the cabin frame, the guide members being configured to move by sliding or rolling along the one or more guide rails.

14. The elevator according to claim 10, further comprising:

a motor and a drive wheel configured to be rotatable by the motor; and an elevator control system configured to control movement of the elevator car in response to signals received from one or more user interfaces located at one or more landings or located inside the elevator car, by controlling rotation of the motor.

15. An elevator car, comprising:

a pulley frame;

a cabin frame mounted on the pulley frame;

one or more pulleys mounted on the pulley frame;

cabin structures defining a cabin interior of the elevator car, the cabin structures being mounted on the cabin frame;

at least one elastically deformable support member between the cabin frame and the pulley frame, the cabin frame resting on the at least one elastically deformable support member on the pulley frame; and at least one parallel motion linkage mechanism pivotally connect the cabin frame to the pulley frame, the at least one parallel motion linkage mechanism configured to allow the cabin frame to move up and down relative to the pulley frame while keeping a relative angle between the cabin frame and the pulley frame unchanged, wherein each of the at least one parallel motion linkage mechanism comprises, a first lever connected to the pulley frame via a first pivot and connected to the cabin frame via a second pivot, and a second lever connected to the pulley frame via a third pivot and connected to the cabin frame via a fourth pivot.

16. The elevator car according to claim 15, wherein the first pivot, the second pivot, the third pivot, and the fourth pivot are such that a first pivot axis of the first pivot and a third pivot axis of the third pivot are on a first plane, and a second pivot axis of the second pivot and a fourth pivot axis of the fourth pivot are on a second plane, wherein the first plane and the second plane are parallel with each other; and the first pivot axis of the first pivot and the second pivot axis of the second pivot are on a third plane, and the third pivot axis of the third pivot and the fourth pivot axis of the fourth pivot are on a fourth plane, wherein the third plane and the fourth plane are parallel with each other.

17. The elevator car according to claim 16, wherein the first pivot axis, the second pivot axis, the third pivot axis, and the fourth pivot axis are horizontal.

18. The elevator car according to claim 16, wherein the first plane and the second plane are vertical.

19. The elevator car according to claim 16, wherein the third plane and the fourth plane are less than 30 degrees from a horizontal plane.

20. The elevator car according to claim 15, wherein each of the first pivot, the second pivot, the third pivot, and the fourth pivot comprises a shaft pin that passes through openings of the first lever and the second lever.

21. The elevator car according to claim 20, wherein one or more of the first pivot, the second pivot, the third pivot, and the fourth pivot comprise a bushing respectively around the shaft pin in an opening from among the openings, and the bushing comprises plastic, elastomer or rubber.

* * * * *